(12) United States Patent
Yang et al.

(10) Patent No.: US 12,083,472 B1
(45) Date of Patent: Sep. 10, 2024

(54) DEVICE AND METHOD FOR CAPTURING CARBON DIOXIDE AND PRODUCING ORGANIC WEAK ACID SALT

(71) Applicant: Shanxi Dadi Ecological Environment Technology Research Institute Co., Ltd., Taiyuan (CN)

(72) Inventors: Chengli Yang, Taiyuan (CN); Qian Liu, Taiyuan (CN); Xu Liu, Taiyuan (CN); Juanjuan Li, Taiyuan (CN); Zhihun Di, Shuozhou (CN); Jian Li, Taiyuan (CN); Jin Wang, Taiyuan (CN); Xiaohui Wu, Taiyuan (CN); Xiuli Li, Jinzhong (CN)

(73) Assignee: SHANXI DADI ECOLOGICAL ENVIRONMENT TECHNOLOGY RESEARCH INSTITUTE CO., LTD., Taiyuan (CN)

( * ) Notice: Subject to any disclaimer, the term of this patent is extended or adjusted under 35 U.S.C. 154(b) by 0 days.

(21) Appl. No.: 18/416,921

(22) Filed: Jan. 19, 2024

(30) Foreign Application Priority Data

Jul. 7, 2023 (CN) .......................... 202310831517.4

(51) Int. Cl.
  *B01D 53/14* (2006.01)
  *B01D 53/90* (2006.01)
  (Continued)

(52) U.S. Cl.
  CPC ..... *B01D 53/1475* (2013.01); *B01D 53/1493* (2013.01); *B01D 53/90* (2013.01);
  (Continued)

(58) Field of Classification Search
  CPC ............ B01D 53/1475; B01D 53/1493; B01D 53/90; B01D 2257/504; B01D 2258/0283;
  (Continued)

(56) References Cited

U.S. PATENT DOCUMENTS 1,990,217 A * 2/1935 Baehr .................... C10K 1/143
  423/226

FOREIGN PATENT DOCUMENTS

CN    115554826 A * 1/2023

OTHER PUBLICATIONS

CN-115554826-A English translation (Year: 2023).*
(Continued)

*Primary Examiner* — Anita Nassiri-Motlagh
(74) *Attorney, Agent, or Firm* — Zhigang Ma

(57) ABSTRACT

A device and a method for capturing carbon dioxide and producing an organic weak acid salt. The device uses ammonia, chloroacetic acid, and hexamethylenetetramine as raw materials to prepare a non-amine carbon dioxide absorbent in the spray evaporation tower, then the non-amine carbon dioxide absorbent is transmitted to an atomizing carbon dioxide absorption tower, and the non-amine carbon dioxide absorbent is dispersed in the atomizing carbon dioxide absorption tower through second atomizing nozzles; a flue gas enters the atomizing carbon dioxide absorption tower, and the flue gas is mixed with the non-amine carbon dioxide absorbent to capture carbon dioxide; the non-amine carbon dioxide absorbent containing the carbon dioxide is transmitted to a carbon dioxide desorption chamber to obtain desorbed carbon dioxide and desorbed non-amine carbon dioxide absorbent; the desorbed non-amine carbon dioxide absorbent is transmitted to the absorbent storage tank for cooling crystallization to obtain the organic weak acid salt.

8 Claims, 1 Drawing Sheet

(51) Int. Cl.
   *B01J 8/00*        (2006.01)
   *B01J 8/10*        (2006.01)
(52) U.S. Cl.
   CPC ............... *B01J 8/004* (2013.01); *B01J 8/10*
      (2013.01); *B01D 2257/504* (2013.01); *B01D*
         *2258/0283* (2013.01); *B01J 2208/00752*
      (2013.01); *B01J 2208/0084* (2013.01); *B01J*
                              *2208/00902* (2013.01)
(58) Field of Classification Search
   CPC .... B01J 8/004; B01J 8/10; B01J 2208/00752;
                  B01J 2208/0084; B01J 2208/00902
   USPC ....................................................... 423/230
   See application file for complete search history.

(56)            References Cited

OTHER PUBLICATIONS

CNIPA, Notification of a First Office Action for CN202310831517. 4, Aug. 10, 2023.
Shanxi Dadi Ecological Environment Technology Research Institute Co., Ltd (Applicant), Reply to Notification of a First Office Action for CN202310831517.4, w/ replacement claims, Aug. 22, 2023.
Shanxi Dadi Ecological Environment Technology Research Institute Co., Ltd (Applicant), Supplemental Reply to Notification of a First Office Action for CN202310831517.4, w/ (allowed) replacement claims, Aug. 23, 2023.
CNIPA, Notification to grant patent right for invention in CN202310831517.4, Aug. 25, 2023.

\* cited by examiner

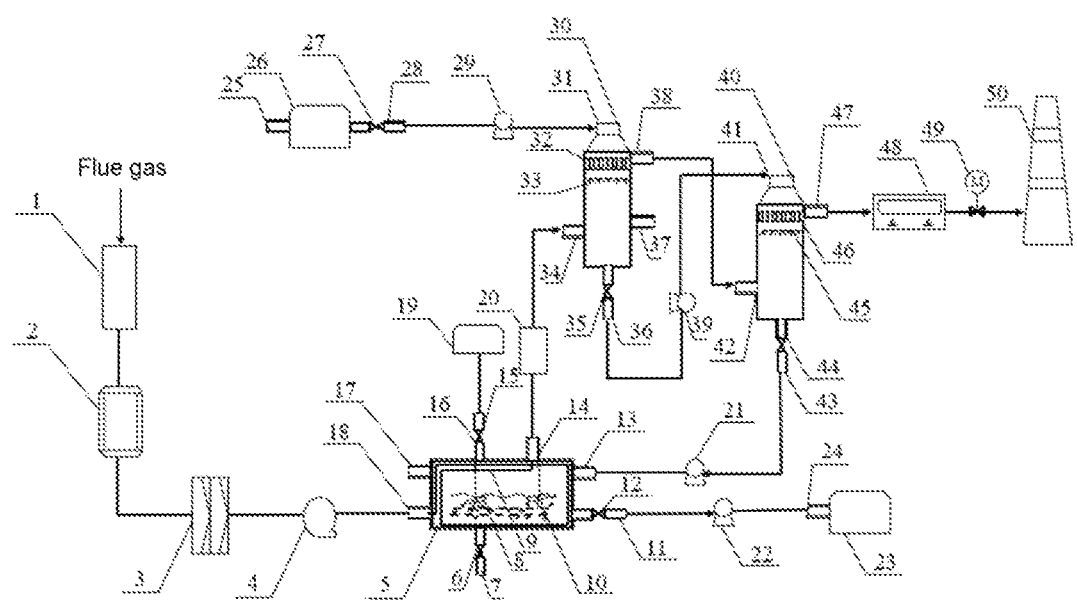

DEVICE AND METHOD FOR CAPTURING CARBON DIOXIDE AND PRODUCING ORGANIC WEAK ACID SALT

TECHNICAL FIELD

The present disclosure relates to the technical field of carbon dioxide capture, and particularly to a device and a method for capturing carbon dioxide and producing an organic weak acid salt.

BACKGROUND

Greenhouse gases emitted by human activities are the main cause of global climate change, among which carbon dioxide has the greatest impact on the greenhouse effect. For countries consuming a lot of energy, carbon dioxide mainly comes from the power industry using coal, and reducing carbon dioxide emission of coal-fired power plants is a key of controlling carbon dioxide emission. In the post-combustion carbon dioxide capture technology, a traditional device for capturing carbon dioxide in a flue gas is mainly composed of an absorption tower and a regeneration tower, and monoethanolamine (MEA) aqueous solution is used as an absorbent in a carbon dioxide capture process. However, traditional absorption devices have some problems: waste heat of the flue gas is not fully utilized, resulting in waste of heat energy; the loss (evaporation, degradation) of absorbent in an operation process is large; energy consumption of absorbent regeneration is large; amines have secondary pollution on environment; and the absorbent will corrode devices. These problems will result in high costs, which hinders large-scale industrial applications of the traditional absorption devices. Therefore, the development of capture devices with low energy consumption is essential to the costs of carbon dioxide capture.

In conclusion, the prior art of capturing carbon dioxide from flue gas in coal-fired power plants has the problems of large energy consumption in absorbent regeneration, high cost of capturing carbon dioxide, and low efficiency in capturing carbon dioxide, and therefore it is necessary to consider the innovation and improvement of devices, and organic weak acid salts are widely used in industry as a kind of chemical reagents. According to the current situation of these technologies, it can be considered to use a device for capturing carbon dioxide in a flue gas and producing an organic weak acid salt. In the device for capturing carbon dioxide and producing the organic weak acid salt, waste heat of the flue gas and a solid acid catalyst can synergistically act on a desorption process of carbon dioxide, which improves capture efficiency and reduces energy consumption.

SUMMARY

To solve the above problem, a purpose of the present disclosure provides a device and a method for capturing carbon dioxide and producing an organic weak acid salt, and the device can efficiently capture carbon dioxide in flue gases of coal-fired power plants by using a non-amine chemical absorbent.

To achieve the above purpose, the present disclosure provides a device for capturing carbon dioxide and producing an organic weak acid salt. The device includes a denitration chamber for connecting to a flue gas pipe. A flue gas outlet of the denitration chamber is connected to a first flue gas inlet of a carbon dioxide desorption chamber through an air preheater, a dust catcher, and an induced draft fan; a first flue gas outlet of the carbon dioxide desorption chamber is connected to a second flue gas inlet disposed at a lower part of a spray evaporation tower through a desulfurization chamber; the carbon dioxide desorption chamber is internally provided with a flue gas heat conducting pipeline; the first flue gas inlet and the first flue gas outlet are connected to the flue gas heat conducting pipeline; the carbon dioxide desorption chamber is provided with a solid acid catalyst feed port, and a bottom of the carbon dioxide desorption chamber is provided with a solid acid catalyst discharge port; a carbon dioxide outlet of the carbon dioxide desorption chamber is connected to a carbon dioxide storage tank; a first absorbent feed port of the carbon dioxide desorption chamber is connected to a third absorbent discharge port disposed at a bottom of an atomizing carbon dioxide absorption tower through a fourth water pump; and a first absorbent discharge port of the carbon dioxide desorption chamber is connected to a second absorbent feed port of an absorbent storage tank through a first water pump.

A second liquid feed port disposed at a top of the spray evaporation tower is connected to a liquid discharge port of a liquid storage tank through a second water pump, the spray evaporation tower is internally provided with multiple first atomizing nozzles, the multiple first atomizing nozzles are connected to the second liquid feed port disposed at the top of the spray evaporation tower, a second absorbent discharge port disposed at a bottom of the spray evaporation tower is connected to a third absorbent feed port disposed at a top of the atomizing carbon dioxide absorption tower through a third water pump; the atomizing carbon dioxide absorption tower is internally provided with multiple second atomizing nozzles; the multiple second atomizing nozzles are connected to the third absorbent feed port disposed at the top of the atomizing carbon dioxide absorption tower; a second flue gas outlet of the spray evaporation tower is connected to a third flue gas inlet disposed at a lower part of the atomizing carbon dioxide absorption tower; and the spray evaporation tower is provided with an alkaline solution feed port.

A third flue gas outlet of the atomizing carbon dioxide absorption tower is connected to a gas outlet through a flue gas analyser and an electromagnetic valve.

In an embodiment, each of the carbon dioxide outlet, the first absorbent discharge port, the solid acid catalyst discharge port, the second absorbent discharge port, the liquid discharge port, and the third absorbent discharge port is provided with a control valve.

In an embodiment, the carbon dioxide desorption chamber is internally further provided with stirring blades, and the flue gas heat conducting pipeline is coiled around inner walls of the carbon dioxide desorption chamber.

In an embodiment, a first baffle plate is disposed in the spray evaporation tower, a second baffle plate is disposed in the atomizing carbon dioxide absorption tower, the first baffle plate is located above the multiple first atomizing nozzles, and the second baffle plate is located above the multiple second atomizing nozzles.

A method for capturing carbon dioxide and producing an organic weak acid salt is provided, which is applied to the device for capturing carbon dioxide and producing the organic weak acid salt, and the method includes:

step a: adding ammonia to methanol to obtain a first mixed liquid, then adding hexamethylenetetramine to the first mixed liquid to obtain a second mixed liquid, adding methanol containing chloroacetic acid to the second mixed liquid after the second mixed liquid is clear to obtain a third mixed liquid, stirring and reacting the third mixed liquid for a period of time to obtain the liquid until a temperature of the liquid drops to a room temperature, and storing the liquid in the liquid storage tank;

step b: transmitting a flue gas to pass through the denitration chamber, the air preheater, and the dust catcher; using the induced draft fan to transmit the flue gas to the flue gas heat conducting pipeline of the carbon dioxide desorption chamber; using waste heat of the flue gas in the flue gas heat conducting pipeline to raise a temperature of the carbon dioxide desorption chamber to 120 Celsius degrees (° C.); and transmitting the flue gas in the flue gas heat conducting pipeline to the desulfurization chamber for desulfurization, then transmitting the flue gas to the spray evaporation tower;

step c: transmitting the liquid stored in the liquid storage tank to the spray evaporation tower through the second water pump; using the multiple first atomizing nozzles to spray the liquid to obtain an atomized liquid; mixing the atomized liquid with the flue gas transmitted to the spray evaporation tower, and using the waste heat of the flue gas to heat the atomized liquid to obtain a heated liquid at the bottom of the spray evaporation tower; adding an alkaline solution to the heated liquid through the alkaline solution feed port, and obtaining a non-amine carbon dioxide absorbent through a reaction of the alkaline solution and the heated liquid; transmitting a part of the non-amine carbon dioxide absorbent and the flue gas to the atomizing carbon dioxide absorption tower through the second flue gas outlet disposed at an upper part of the spray evaporation tower; transmitting another part of the non-amine carbon dioxide absorbent to the atomizing carbon dioxide absorption tower through the third water pump, using the multiple second atomizing nozzles to atomize the non-amine carbon dioxide absorbent in the atomizing carbon dioxide absorption tower, mixing the atomized non-amine carbon dioxide absorbent with the flue gas transmitted from the third flue gas inlet to absorb carbon dioxide from the flue gas;

step d: transmitting the flue gas in the atomizing carbon dioxide absorption tower to the flue gas analyser through the third flue gas outlet disposed at a top of the atomizing carbon dioxide absorption tower; using the flue gas analyser to detect a carbon dioxide concentration of the flue gas, in response to the carbon dioxide concentration being less than 1%, controlling the electromagnetic valve to open, and discharging the flue gas from the gas outlet; and transmitting the non-amine carbon dioxide absorbent at the bottom of the atomizing carbon dioxide absorption tower to the carbon dioxide desorption chamber;

step e: adding a solid acid catalyst into the carbon dioxide desorption chamber through the solid acid catalyst feed port, and using the stirring blades to mix the solid acid catalyst with the non-amine carbon dioxide absorbent, thereby performing a carbon dioxide desorption reaction to obtain desorbed carbon dioxide and desorbed non-amine carbon dioxide absorbent; storing the desorbed carbon dioxide in the carbon dioxide storage tank; after completing the carbon dioxide desorption reaction, transmitting the desorbed non-amine carbon dioxide absorbent to the absorbent storage tank, and obtaining sodium glycine after cooling crystallization of the desorbed non-amine carbon dioxide absorbent; and step f: discharging the solid acid catalyst in the carbon dioxide desorption chamber through the solid acid catalyst discharge port for recycling the solid acid catalyst.

In an embodiment, in the step a, a molar ratio of the ammonia to the chloroacetic acid is (1.5-2.5):1, and a molar ratio of the ammonia to the hexamethylenetetramine is (4.5-5.5):1.

In an embodiment, in the step e, a dosage of the solid acid catalyst 10 is in a range of 0.02%-2% of a mass of the non-amine carbon dioxide absorbent.

In an embodiment, a volume flowrate ratio of the flue gas entering the spray evaporation tower in the step b to the non-amine carbon dioxide absorbent entering the multiple second atomizing nozzles in the step c is (1400-3000):1.

In an embodiment, a concentration of the non-amine carbon dioxide absorbent in the step c is in a range of 1 mole per liter (mol/L) to 4 mol/L.

Compared with the prior art, the present disclosure has the following beneficial effects. The device for capturing carbon dioxide and producing an organic weak acid salt can use the non-amine chemical absorbent to efficiently capture carbon dioxide in the flue gas of coal-fired power plants and produce the organic weak acid salt. The device of the present disclosure has the advantage that the non-amine chemical absorbent is synthesized by using secondary spray devices, there is no risk of secondary pollution to the environment caused by the volatilization and degradation of amine substances during the carbon dioxide capture, and the efficiency of carbon dioxide capture will not decrease since the loss of absorbent can be avoided, which effectively avoids waste of materials and saves costs. The organic weak acid salt and carbon dioxide are prepared during a desorption process, which improves the added value of the production process. The heat source of the desorption process comes from waste heat of the flue gas, and the solid acid catalyst is added. Specifically, SAPO-34, HZSM-5, and SBA-15 are different types of zeolite molecular sieves that can be used as the solid acid catalysts. The solid acid catalyst can accelerate a desorption rate and reduce a desorption temperature. Compared with conventional carbon dioxide capture devices using amine absorbents, the present disclosure can significantly reduce energy consumption.

BRIEF DESCRIPTION OF DRAWING

FIGURE illustrates a structural schematic diagram of a device for capturing carbon dioxide and producing an organic weak acid salt provided by the present disclosure.

DETAILED DESCRIPTION OF EMBODIMENTS

In order to make the technical problems to be solved, technical solutions and beneficial effects of the present disclosure clearer, the present disclosure will be further described in detail below with reference to drawing and embodiments. It should be understood that specific embodiments described herein are merely to explain the present disclosure and are not intended to limit the present disclosure.

Embodiment 1

A device for capturing carbon dioxide and producing an organic weak acid salt is provided, and the device includes a denitration chamber 1, an air preheater 2, a dust catcher 3, a carbon dioxide desorption chamber 5, a carbon dioxide storage tank 19, a desulfurization chamber 20, an absorbent storage tank 23, a liquid storage tank 26, a spray evaporation tower 30, an atomizing carbon dioxide absorption tower 40, a flue gas analyser 48, and a gas outlet 50.

A side of the carbon dioxide desorption chamber 5 is provided with a first flue gas inlet 18 and a solid acid catalyst feed port 17, another side of the carbon dioxide desorption chamber 5 is provided with a first absorbent feed port 13 and a first absorbent discharge port 11. There is a first absorbent outlet valve 12 at the first absorbent discharge port 11. A flue gas outlet 14 and a carbon dioxide outlet 15 is disposed at the top of the carbon dioxide desorption chamber 5. A carbon dioxide outlet valve 16 is disposed at the carbon dioxide outlet 15. A solid acid catalyst discharge port 7 is disposed at the bottom of the carbon dioxide desorption chamber 5, and a solid acid catalyst outlet valve 6 is disposed at the solid acid catalyst discharge port 7. Stirring blades 8 and a flue gas heat conducting pipeline 9 are disposed in the carbon dioxide desorption chamber 5.

A side of the absorbent storage tank 23 is provided with a second absorbent feed port 24. A side of the liquid storage tank 26 is provided with a first liquid feed port 25, another side of the liquid storage tank 26 is provided with a liquid discharge port 28. A liquid outlet valve 27 is disposed at the liquid discharge port 28.

A top of the spray evaporation tower 30 is provided with a second liquid feed port 31, a side of the spray evaporation tower 30 is provided with a second flue gas inlet 34, a second flue gas outlet 38, and an alkaline solution feed port 37. The spray evaporation tower 30 is internally provided with a first baffle plate 32 and first atomizing nozzles 33. A bottom of the spray evaporation tower 30 is provided with a second absorbent discharge port 36. A second absorbent outlet valve 35 is disposed at the second absorbent discharge port 36.

A top of the atomizing carbon dioxide absorption tower 40 is provided with a third absorbent feed port 41. A side of the atomizing carbon dioxide absorption tower 40 is provided with a third flue gas inlet 42 and a third flue gas outlet 47. The atomizing carbon dioxide absorption tower 40 is internally provided with a second baffle plate 46 and second atomizing nozzles 45. A bottom of the atomizing carbon dioxide absorption tower 40 is provided with a third absorbent discharge port 43. A third absorbent outlet valve 44 is disposed at the third absorbent discharge port 43.

The dust catcher 3 is connected to the first flue gas inlet 18 of the carbon dioxide desorption chamber 5 through a pipeline, and an induced draft fan 4 is disposed at the pipeline. The first flue gas outlet 14 of the carbon dioxide desorption chamber 5 is connected to the desulfurization chamber 20 through a pipeline, a flue gas enters the desulfurization chamber 20 for desulfurization, and then the flue gas enters the spray evaporation tower 30 through the second flue gas inlet 34 along a pipeline. The first absorbent discharge port 11 of the carbon dioxide desorption chamber 5 is connected to the second absorbent feed port 24 of the absorbent storage tank 23 through a pipeline, and a first water pump 22 is disposed at the pipeline. The liquid discharge port 28 of the liquid storage tank 26 is connected to the second liquid feed port 31 of the spray evaporation tower 30 through a pipeline, and a second water pump 29 is disposed at the pipeline. The second absorbent discharge port 36 of the spray evaporation tower 30 is connected to the third absorbent feed port 41 of the atomizing carbon dioxide absorption tower 40 through the pipeline, and a third water pump 39 is disposed at the pipeline. The third absorbent discharge port 43 of the atomizing carbon dioxide absorption tower 40 is connected to the first absorbent feed port 13 of the carbon dioxide desorption chamber 5 through a pipeline, and a fourth water pump 21 is disposed at the pipeline.

A method for capturing carbon dioxide and producing an organic weak acid salt is provided, and the method is applied to the device for capturing carbon dioxide and producing the organic weak acid salt. The method includes the following steps.

Step a: ammonia is added to methanol to obtain a first mixed liquid, then hexamethylenetetramine is added to the first mixed liquid to obtain a second mixed liquid; methanol containing chloroacetic acid is added to the second mixed liquid after the second mixed liquid is clear to obtain a third mixed liquid, the third mixed liquid is stirred and reacted for a period of time to obtain a liquid until a temperature of the liquid drops to a room temperature, then the liquid is stored in the liquid storage tank 26 through the first liquid feed port 25.

Step b: a high-temperature flue gas to passes through the denitration chamber 1, the air preheater 2, and the dust catcher 3; then induced draft fan 4 transmit the high-temperature flue gas to the flue gas heat conducting pipeline 9 of the carbon dioxide desorption chamber 5 through the first flue gas inlet 18; waste heat of the flue gas in the flue gas heat conducting pipeline 9 is used to raise a temperature of the carbon dioxide desorption chamber 5 to 120 Celsius degrees (C.); then the flue gas in the flue gas heat conducting pipeline 9 is transmitted to the desulfurization chamber 20 for desulfurization, then the flue gas is transmitted to the spray evaporation tower 30 through the second flue gas inlet 34.

Step c: the liquid outlet valve 27 is opened, the liquid passes through the liquid discharge port 28, the second water pump 29, and the second liquid feed port 31 to enter the spray evaporation tower 30; the first atomizing nozzles 33 spray out the liquid, and the liquid is atomized in the spray evaporation tower 30; the atomized liquid is fully mixed with the flue gas entered from the second flue gas inlet 34; the waste heat of the flue gas is used to heat the atomized liquid to obtain a heated liquid at the bottom of the spray evaporation tower 30; the first baffle plate 32 is located above the first atomizing nozzles 33, and the first baffle plate 32 is configured to condense and reflux the atomized liquid; a strong alkaline solution is added to the heated liquid through the alkaline solution feed port 37, and a non-amine carbon dioxide absorbent is obtained after a reaction; when the flue gas reaches at the top of the spray evaporation tower 30, the flue gas is transmitted from the second flue gas outlet 38 to the atomizing carbon dioxide absorption tower 40 through a pipeline; the second absorbent outlet valve 35 is opened, the non-amine carbon dioxide absorbent passes through the second absorbent discharge port 36, the third water pump 39, and the third absorbent feed port 41 to enter the atomizing carbon dioxide absorption tower 40; the non-amine carbon dioxide absorbent is sprayed out from the second atomizing nozzles 45 to form atomized non-amine carbon dioxide absorbent in the atomizing carbon dioxide absorption tower 40, the atomized non-amine carbon dioxide absorbent is fully mixed with the flue gas entered from third flue gas inlet 42 to absorb carbon dioxide from the flue gas; the second baffle plate 46 is located above the second atomizing nozzles 45, and the second baffle plate 46 is configured to condense and reflux the atomized non-amine carbon dioxide absorbent.

Step d: the flue gas is transmitted to the flue gas analyser 40 through a third flue gas outlet 47 disposed at a top of the atomizing carbon dioxide absorption tower 40; the flue gas analyser 40 is configured to detect a carbon dioxide concentration of the flue gas, the electromagnetic valve 49 is controlled to open when the carbon dioxide concentration is less than 1%, and a flue gas with the carbon dioxide concentration less than 1% is discharged from the gas outlet 50; when the non-amine carbon dioxide absorbent reaches at the bottom of the atomizing carbon dioxide absorption tower 40, the third absorbent outlet valve 44 is opened, the non-amine carbon dioxide absorbent passes through the third absorbent discharge port 43, the fourth water pump 21, and the first absorbent feed port 13 to enter the carbon dioxide desorption chamber 5.

Step e: a solid acid catalyst 10 is added into the carbon dioxide desorption chamber 5 through the solid acid catalyst feed port 17, stirring blades 8 are turned on to mix the solid acid catalyst 10 with the non-amine carbon dioxide absorbent, thereby performing a carbon dioxide desorption reaction to obtain desorbed carbon dioxide and a desorbed non-amine carbon dioxide absorbent; a carbon dioxide outlet valve 16 is opened, and the desorbed carbon dioxide passes through the carbon dioxide outlet 15 to enter the carbon dioxide storage tank 19; after completing the carbon dioxide desorption reaction, the first absorbent outlet valve 12 is opened, and the desorbed non-amine carbon dioxide absorbent is discharged from the first absorbent discharge port 11; the desorbed non-amine carbon dioxide absorbent passes through the first water pump 22 and the second absorbent feed port 24 to enter the absorbent storage tank 23, and sodium glycine is obtained after cooling crystallization of the desorbed non-amine carbon dioxide absorbent.

Step f: the solid acid catalyst outlet valve 6 is opened, and the solid acid catalyst 10 in the carbon dioxide desorption chamber 5 is discharged through the solid acid catalyst discharge port 7 for recycling the solid acid catalyst 10.

Specifically, in the step a, a molar ratio of the ammonia to the chloroacetic acid is 1.5:1, and a molar ratio of the ammonia to the hexamethylenetetramine is 4.5:1. A volume flowrate ratio of the flue gas entering the spray evaporation tower 30 in the step b to the non-amine carbon dioxide absorbent entering the second atomizing nozzles 45 in the step c is 3000:1. In the step c, the alkaline solution is a sodium hydroxide solution, a concentration of the non-amine carbon dioxide absorbent is 1 mole per liter (mol/L). In the step e, the solid acid catalyst 10 is HZSM-5, the solid acid catalyst 10 is easy to be separated and recycled since HZSM-5 is a solid catalyst, and a dosage of the solid acid catalyst 10 is 0.02% of a mass of the non-amine carbon dioxide absorbent.

In the embodiment 1, a yield of sodium glycine is 70%, a carbon dioxide capture rate is 87%, and a carbon dioxide capture capacity is 1.2 tons per hour (t/h).

Embodiment 2

The embodiment 2 is similar to the embodiment 1. Compared with the embodiment 1, the embodiment 2 has the following differences. In the step a, a molar ratio of the ammonia to the chloroacetic acid is 2:1, and a molar ratio of the ammonia to the hexamethylenetetramine is 5:1. A volume flowrate ratio of the flue gas entering the spray evaporation tower 30 in the step b to the non-amine carbon dioxide absorbent entering the second atomizing nozzles 45 in the step c is 1400:1. In the step c, a concentration of the non-amine carbon dioxide absorbent is 4 mol/L. In the step e, the solid acid catalyst 10 is SAPO-34, and a dosage of the solid acid catalyst 10 is 1% of a mass of the non-amine carbon dioxide absorbent.

In the embodiment 2, a yield of sodium glycine is 72%, a carbon dioxide capture rate is 92%, and a carbon dioxide capture capacity is 1.27 t/h.

Embodiment 3

The embodiment 3 is similar to the embodiment 1. Compared with the embodiment 1, the embodiment 3 has the following differences. In the step a, a molar ratio of the ammonia to the chloroacetic acid is 2.5:1, and a molar ratio of the ammonia to the hexamethylenetetramine is 5.5:1. A volume flowrate ratio of the flue gas entering the spray evaporation tower 30 in the step b to the non-amine carbon dioxide absorbent entering the second atomizing nozzles 45 in the step c is 2400:1. In the step c, a concentration of the non-amine carbon dioxide absorbent is 2 mol/L. In the step e, the solid acid catalyst 10 is $ZrO_2$/SBA-15, and a dosage of the solid acid catalyst 10 is 2% of a mass of the non-amine carbon dioxide absorbent.

In the embodiment 3, a yield of sodium glycine is 74%, a carbon dioxide capture rate is 90%, and a carbon dioxide capture capacity is 1.24 t/h.

Embodiment 4

The embodiment 4 is similar to the embodiment 1. Compared with the embodiment 1, the embodiment 4 has the following differences. A volume flowrate ratio of the flue gas entering the spray evaporation tower 30 in the step b to the non-amine carbon dioxide absorbent entering the second atomizing nozzles 45 in the step c is 1800:1. In the step c, a concentration of the non-amine carbon dioxide absorbent is 3 mol/L. In the step e, the solid acid catalyst 10 is $TiO(OH)_2$, and a dosage of the solid acid catalyst 10 is 1.5% of a mass of the non-amine carbon dioxide absorbent.

In the embodiment 4, a yield of sodium glycine is 70%, a carbon dioxide capture rate is 93%, and a carbon dioxide capture capacity is 1.28 t/h.

The above embodiments are only exemplary embodiments of the present disclosure and are not intended to limit the present disclosure. Any modifications, equivalent replacements, and improvements made within the spirit and principles of the present disclosure should be included within the scope of the present disclosure.

What is claimed is:

1. A device for capturing carbon dioxide and producing an organic weak acid salt, comprising: a denitration chamber for connecting to a flue gas pipe; wherein a flue gas outlet of the denitration chamber is connected to a first flue gas inlet of a carbon dioxide desorption chamber through an air preheater, a dust catcher, and an induced draft fan; a first flue gas outlet of the carbon dioxide desorption chamber is connected to a second flue gas inlet disposed at a lower part of a spray evaporation tower through a desulfurization chamber; the carbon dioxide desorption chamber is internally provided with a flue gas heat conducting pipeline; the first flue gas inlet and the first flue gas outlet are connected to the flue gas heat conducting pipeline; the carbon dioxide desorption chamber is provided with a solid acid catalyst feed port, and a bottom of the carbon dioxide desorption chamber is provided with a solid acid catalyst discharge port; a carbon dioxide outlet of the carbon dioxide desorption chamber is connected to a carbon dioxide storage tank; a first absorbent feed port of the carbon dioxide desorption chamber is connected to a third absorbent discharge port disposed at a bottom of an atomizing carbon dioxide absorption tower through a fourth water pump; and a first absorbent discharge port of the carbon dioxide desorption chamber is connected to a second absorbent feed port of an absorbent storage tank through a first water pump;

a second liquid feed port disposed at a top of the spray evaporation tower is connected to a liquid discharge port of a liquid storage tank through a second water pump; a liquid in the liquid storage tank is obtained by: adding ammonia to methanol to obtain a first mixed liquid, then adding hexamethylenetetramine to the first mixed liquid according to a molar ratio of the ammonia to the hexamethylenetetramine being (4.5-5.5): 1 to obtain a second mixed liquid, adding methanol containing chloroacetic acid to the second mixed liquid according to a molar ratio of the ammonia to the chloroacetic acid being (1.5-2.5): 1 after the second mixed liquid is clear to obtain a third mixed liquid, stirring and reacting the third mixed liquid to obtain the liquid until a temperature of the liquid drops to a room temperature; the liquid storage tank is configured to store the liquid; the spray evaporation tower is internally provided with a plurality of first atomizing nozzles, the plurality of first atomizing nozzles are connected to the second liquid feed port disposed at the top of the spray evaporation tower, a second absorbent discharge port disposed at a bottom of the spray evaporation tower is connected to a third absorbent feed port disposed at a top of the atomizing carbon dioxide absorption tower through a third water pump; the atomizing carbon dioxide absorption tower is internally provided with a plurality of second atomizing nozzles; the plurality of second atomizing nozzles are connected to the third absorbent feed port disposed at the top of the atomizing carbon dioxide absorption tower; a second flue gas outlet of the spray evaporation tower is connected to a third flue gas inlet disposed at a lower part of the atomizing carbon dioxide absorption tower; and the spray evaporation tower is provided with an alkaline solution feed port; and a third flue gas outlet of the atomizing carbon dioxide absorption tower is connected to a gas outlet through a flue gas analyser and an electromagnetic valve.

2. The device for capturing carbon dioxide and producing the organic weak acid salt as claimed in claim 1, wherein each of the carbon dioxide outlet, the first absorbent discharge port, the solid acid catalyst discharge port, the second absorbent discharge port, the liquid discharge port, and the third absorbent discharge port is provided with a control valve.

3. The device for capturing carbon dioxide and producing the organic weak acid salt as claimed in claim 1, wherein the carbon dioxide desorption chamber is internally further provided with stirring blades, and the flue gas heat conducting pipeline is coiled around inner walls of the carbon dioxide desorption chamber.

4. The device for capturing carbon dioxide and producing the organic weak acid salt as claimed in claim 1, wherein a first baffle plate is disposed in the spray evaporation tower, a second baffle plate is disposed in the atomizing carbon dioxide absorption tower, the first baffle plate is located above the plurality of first atomizing nozzles, and the second baffle plate is located above the plurality of second atomizing nozzles.

5. A method for capturing carbon dioxide and producing an organic weak acid salt, applied to the device for capturing carbon dioxide and producing the organic weak acid salt as claimed in claim 1, comprising:

step a: adding ammonia to methanol to obtain a first mixed liquid, then adding hexamethylenetetramine to the first mixed liquid according to a molar ratio of the ammonia to the hexamethylenetetramine being (4.5-5.5):1 to obtain a second mixed liquid, adding methanol containing chloroacetic acid to the second mixed liquid according to a molar ratio of the ammonia to the chloroacetic acid being (1.5-2.5):1 after the second mixed liquid is clear to obtain a third mixed liquid, stirring and reacting the third mixed liquid to obtain a liquid until a temperature of the liquid drops to a room temperature, and storing the liquid in the liquid storage tank;

step b: transmitting a flue gas to pass through the denitration chamber, the air preheater, and the dust catcher; using the induced draft fan to transmit the flue gas to the flue gas heat conducting pipeline of the carbon dioxide desorption chamber; using waste heat of the flue gas in the flue gas heat conducting pipeline to raise a temperature of the carbon dioxide desorption chamber to 120 Celsius degrees (° C.); and transmitting the flue gas in the flue gas heat conducting pipeline to the desulfurization chamber for desulfurization, then transmitting the flue gas to the spray evaporation tower;

step c: transmitting the liquid stored in the liquid storage tank to the spray evaporation tower through the second water pump; using the plurality of first atomizing nozzles to spray the liquid to obtain an atomized liquid; mixing the atomized liquid with the flue gas transmitted to the spray evaporation tower, and using the waste heat of the flue gas to heat the atomized liquid to obtain a heated liquid at the bottom of the spray evaporation tower; adding an alkaline solution to the heated liquid through the alkaline solution feed port, and obtaining a non-amine carbon dioxide absorbent through a reaction of the alkaline solution and the heated liquid; transmitting a part of the non-amine carbon dioxide absorbent and the flue gas to the atomizing carbon dioxide absorption tower through the second flue gas outlet disposed at an upper part of the spray evaporation tower; transmitting another part of the non-amine carbon dioxide absorbent to the atomizing carbon dioxide absorption tower through the third water pump, using the plurality of second atomizing nozzles to atomize the non-amine carbon dioxide absorbent in the atomizing carbon dioxide absorption tower, mixing the atomized non-amine carbon dioxide absorbent with the flue gas transmitted from the third flue gas inlet to absorb carbon dioxide from the flue gas;

step d: transmitting the flue gas in the atomizing carbon dioxide absorption tower to the flue gas analyser through the third flue gas outlet disposed at a top of the atomizing carbon dioxide absorption tower; using the flue gas analyser to detect a carbon dioxide concentration of the flue gas, in response to the carbon dioxide concentration being less than 1%, controlling the electromagnetic valve to open, and discharging the flue gas from the gas outlet; and transmitting the non-amine carbon dioxide absorbent at the bottom of the atomizing carbon dioxide absorption tower to the carbon dioxide desorption chamber;

step e: adding a solid acid catalyst into the carbon dioxide desorption chamber through the solid acid catalyst feed port, and using the stirring blades to mix the solid acid catalyst with the non-amine carbon dioxide absorbent, thereby performing a carbon dioxide desorption reaction to obtain desorbed carbon dioxide and a desorbed non-amine carbon dioxide absorbent; storing the desorbed carbon dioxide in the carbon dioxide storage tank; after completing the carbon dioxide desorption reaction, transmitting the desorbed non-amine carbon dioxide absorbent to the absorbent storage tank, and obtaining sodium glycine after cooling crystallization of the desorbed non-amine carbon dioxide absorbent; and step f: discharging the solid acid catalyst in the carbon dioxide desorption chamber through the solid acid catalyst discharge port for recycling the solid acid catalyst.

6. The method as claimed in claim 5, wherein in the step e, a dosage of the solid acid catalyst is in a range of 0.02%-2% of a mass of the non-amine carbon dioxide absorbent.

7. The method as claimed in claim 5, wherein a volume flowrate ratio of the flue gas entering the spray evaporation tower in the step b to the non-amine carbon dioxide absorbent entering the plurality of second atomizing nozzles in the step c is (1400-3000):1.

8. The method as claimed in claim 5, wherein a concentration of the non-amine carbon dioxide absorbent in the step c is in a range of 1 mole per liter (mol/L) to 4 mol/L.

* * * * *